United States Patent
Fukuma et al.

(10) Patent No.: US 11,942,981 B2
(45) Date of Patent: Mar. 26, 2024

(54) RECEIVER, COMMUNICATION SYSTEM, CONTROL CIRCUIT, AND STORAGE MEDIUM

(71) Applicant: Mitsubishi Electric Corporation, Tokyo (JP)

(72) Inventors: Megumi Fukuma, Tokyo (JP); Masatsugu Higashinaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 84 days.

(21) Appl. No.: 17/727,361

(22) Filed: Apr. 22, 2022

(65) Prior Publication Data
US 2022/0247448 A1 Aug. 4, 2022

Related U.S. Application Data

(63) Continuation of application No. PCT/JP2020/000500, filed on Jan. 9, 2020.

(51) Int. Cl.
*H04B 1/709* (2011.01)
*H04W 52/36* (2009.01)
*H04B 1/69* (2011.01)

(52) U.S. Cl.
CPC .......... *H04B 1/709* (2013.01); *H04W 52/367* (2013.01); *H04B 2001/6912* (2013.01)

(58) Field of Classification Search
CPC ............ H04B 1/709; H04B 2001/6912; H04B 1/7087; H04B 1/7093; H04W 52/367; H04W 52/225; H04W 52/42; H04W 72/04
USPC ........................................................ 375/139
See application file for complete search history.

(56) References Cited

U.S. PATENT DOCUMENTS

| | | | |
|---|---|---|---|
| 2002/0093880 A1* | 7/2002 | Nakamura | G01S 15/8904 367/88 |
| 2004/0024313 A1* | 2/2004 | Moriya | G01S 15/8954 600/437 |

FOREIGN PATENT DOCUMENTS

JP    2019-21964 A    2/2019

OTHER PUBLICATIONS

International Search Report for PCT/JP2020/000500 dated Feb. 10, 2020.

(Continued)

*Primary Examiner* — Fitwi Y Hailegiorgis
(74) *Attorney, Agent, or Firm* — Birch, Stewart, Kolasch & Birch, LLP

(57) ABSTRACT

A receiver includes: a correlation value calculation unit calculating a first cross-correlation function between a received signal, having a preamble spread with an up chirp and a down chirp, and the up chirp and calculating a second cross-correlation function between the received signal and the down chirp; a power value calculation unit calculating first and second power values of the first and second cross-correlation functions; a correlation power memory storing the first and second power values at each sample timing for one period of a spread code; a threshold determination unit determining first and second estimated timings from the first and second power values for one period of the spread code, respectively; and an estimation unit estimating a spread code timing of a transmitter using the first and second estimated timings, and performing coarse estimation of a frequency offset with respect to the transmitter.

14 Claims, 12 Drawing Sheets

(56) References Cited

OTHER PUBLICATIONS

Qian et al., "The Acquisition Method of Symmetry Chirp Signal Used in LEO Satellite Internet of Things", IEEE Communications Letters, Jul. 2, 2019, vol. 23, No. 9, total 4 pages.
Written Opinion of the International Searching Authority for PCT/JP2020/000500 dated Feb. 10, 2020.

* cited by examiner

RECEIVER, COMMUNICATION SYSTEM, CONTROL CIRCUIT, AND STORAGE MEDIUM

CROSS-REFERENCE TO RELATED APPLICATION

This application is a continuation application of International Application PCT/JP2020/000500, filed on Jan. 9, 2020, and designating the U.S., the entire contents of which are incorporated herein by reference.

BACKGROUND OF THE INVENTION

1. Field of the Invention

The present disclosure relates to a receiver that performs wireless communication, a communication system, a control circuit, and a storage medium.

2. Description of the Related Art

With the spread of Internet of Things (IoT), machine to machine (M2M), and the like, low power wide area (LPWA) has attracted attention as a communication system for achieving wide-area communication and long-range communication with low power consumption. LPWA has a problem of co-channel interference because different systems are operated at the same frequency. Therefore, in LPWA, it is effective to apply direct sequence spread spectrum (hereinafter referred to as DS-SS) communication that can improve interference immunity, jamming resistance, communication confidentiality, and the like. Long Range (LoRa) as one of the LPWA communication systems is a communication system that uses chirp spread spectrum using a chirp signal that is a phase rotation sequence having a constant amplitude. LoRa has a low rate of communication but can achieve long-range communication. The chirp signal is generally used for radar, sonar, and the like. The chirp signal can reduce a peak-to-average power ratio (PAPR) of a transmission signal and has excellent autocorrelation characteristics, thereby being suitable for timing detection of a received signal and also effective for the DS-SS communication.

In the DS-SS communication, a receiver performs despreading and thus needs to synchronize with the timing at which a signal is multiplied by a spread code in a transmitter. Since the receiver performs the despreading processing on the signal spread in a wide frequency band before despreading, it is important to perform the timing synchronization with high accuracy at a low signal-to-noise ratio (SNR). In a case where there is a frequency offset caused by a frequency shift of a local transmitter between the transmitter and the receiver, a Doppler effect, or the like, it is observed as if the timing is shifted in the DS-SS communication using the chirp signal. In an environment where there is a large frequency offset, the receiver estimates a false shifted timing in the timing synchronization before estimating the amount of frequency offset, which makes it difficult to correctly perform demodulation processing in a subsequent stage.

In response to such a problem, Non Patent Literature 1, Yubi Qian, et al., "The Acquisition Method of Symmetry Chirp Signal Used in LEO Satellite Internet of Things" IEEE Commun. Lett., vol. 22, no. 11, pp. 2230-2233, November 2018. discloses a technique in which a transmitter transmits, as a preamble, a symmetry chirp signal (SCS) that is a revised LoRa chirp signal and includes two symmetric chirp signals of a positive-chirp signal (PCS) whose frequency linearly increases from a certain start frequency and a negative-chirp signal (NCS) whose frequency linearly decreases from the same start frequency as the PCS. In Non Patent Literature 1 described above, a receiver estimates the spread code timing for each of the PCS and the NCS, and then estimates the frequency offset and the spread code timing using fast Fourier transform (FFT). Non Patent Literature 1 described above assumes low-earth-orbit satellite IoT for a low data rate, and the initial acquisition can be performed with high accuracy even in a case where there is a large frequency offset due to the Doppler effect.

However, there has been a problem of increased circuit scale and processing delay in order to process a wideband signal before despreading by the synchronization system using FFT as in Non Patent Literature 1 described above.

SUMMARY OF THE INVENTION

In order to solve the above problem and achieve the object, a receiver of the present disclosure includes: a correlation value calculation unit that calculates a first cross-correlation function between a received signal and an up chirp and calculates a second cross-correlation function between the received signal and a down chirp, the received signal being a signal transmitted from a transmitter and having a preamble spread with the up chirp that is a spread code whose frequency increases with time and the down chirp that is a spread code whose frequency decreases with time; and a power value calculation unit that calculates a first power value of the first cross-correlation function and a second power value of the second cross-correlation function. The receiver further includes: a correlation power memory that stores the first power value and the second power value at each sample timing for one period of the spread code; a determination unit that determines a first estimated timing for the up chirp from the first power values for one period of the spread code, and determines a second estimated timing for the down chirp from the second power values for one period of the spread code; and an estimation unit that estimates a spread code timing of the transmitter using the first estimated timing and the second estimated timing, and performs a coarse estimation of a frequency offset with respect to the transmitter.

DETAILED DESCRIPTION OF THE PREFERRED EMBODIMENTS

Hereinafter, a receiver, a communication system, a control circuit, and a storage medium according to embodiments of the present disclosure will be described in detail with reference to the drawings. Note that the present disclosure is not limited to the embodiments.

First Embodiment

Figure 1:
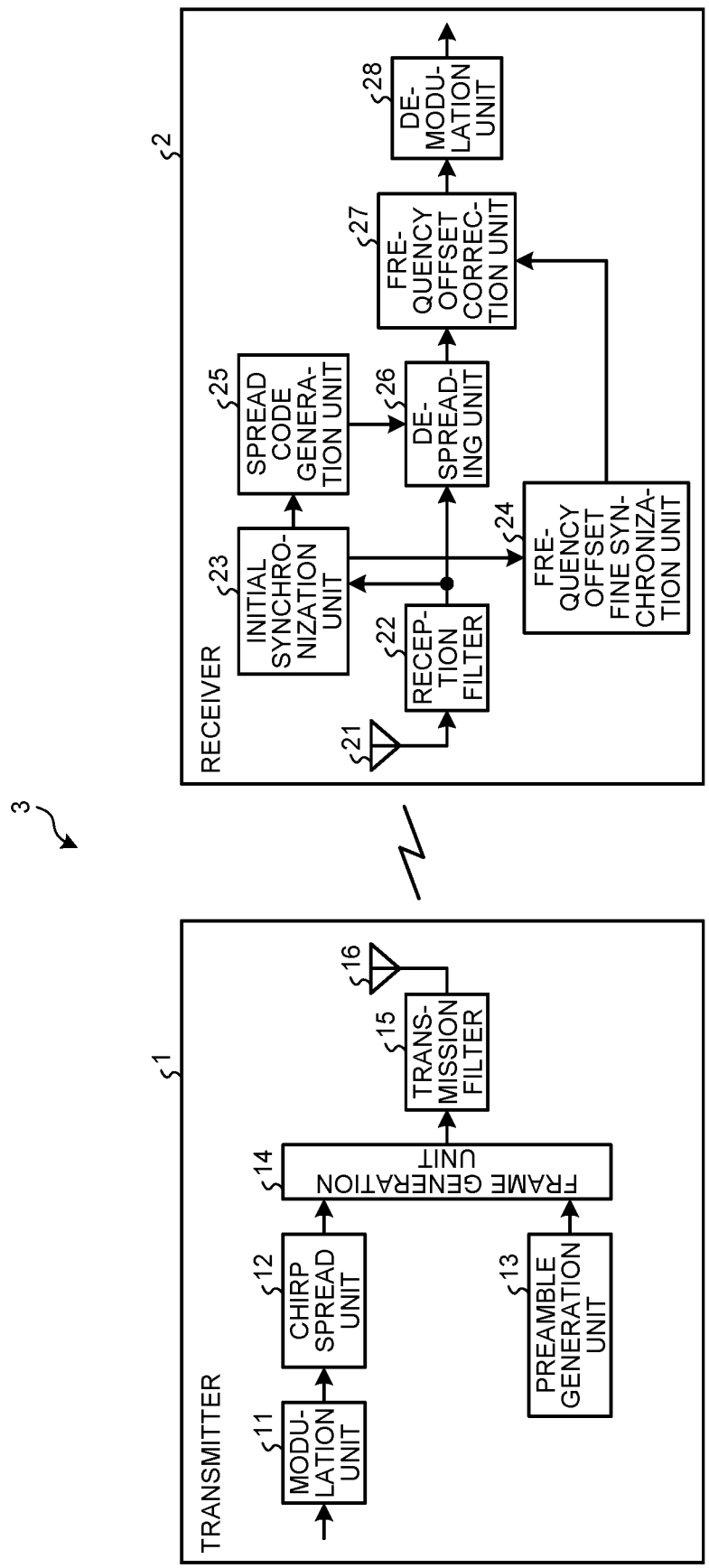
FIG. 1 is a diagram illustrating an example of a configuration of a communication system according to a first embodiment.

FIG. 1 is a diagram illustrating an example of a configuration of a communication system 3 according to a first embodiment. The communication system 3 includes a transmitter 1 and a receiver 2.

Figure 2:
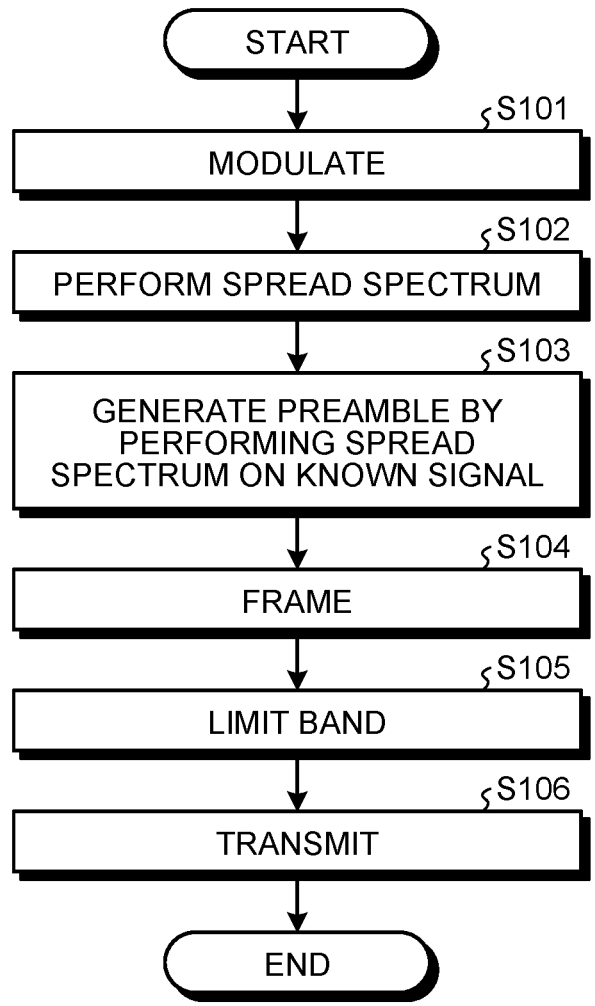
FIG. 2 is a flowchart illustrating an operation of a transmitter according to the first embodiment.

First, the configuration and operation of the transmitter 1 will be described. As illustrated in FIG. 1, the transmitter 1 includes a modulation unit 11, a chirp spread unit 12, a preamble generation unit 13, a frame generation unit 14, a transmission filter 15, and a transmission antenna 16. FIG. 2 is a flowchart illustrating the operation of the transmitter 1 according to the first embodiment.

The modulation unit 11 modulates information bits including zeros and ones (step S101). The modulation unit 11 can use, for example, phase shift keying (PSK), frequency shift keying (FSK), or the like as the modulation system. The modulation unit 11 outputs a modulated signal to the chirp spread unit 12.

The chirp spread unit 12 performs spread spectrum on the modulated signal acquired from the modulation unit 11 by a chirp signal (step S102). The chirp spread unit 12 can use, for example, a Zadoff-Chu sequence as a sequence used in the spread spectrum. When a length of sequence $N_c$ is an even number, a t-th element $C(t)$ of a Zadoff-Chu sequence $C$ is expressed as in the following expression (1).

$$C(t) = \exp j \, (M\pi t^2 / N_c) \quad (1)$$

In expression (1), "M" is a sequence parameter and is relatively prime to "$N_c$". Also, "M" represents the number of increases from a minimum frequency fmin to a maximum frequency fmax in the length of sequence $N_c$. When M=1, the frequency increases from the minimum frequency fmin to the maximum frequency fmax once in the length of sequence $N_c$. When M=2, in the length of sequence $N_c$, the frequency increases from the minimum frequency fmin to the maximum frequency fmax, and then increases again from the minimum frequency fmin to the maximum frequency fmax. That is, when M=2, the frequency increases from the minimum frequency fmin to the maximum frequency fmax twice in the length of sequence $N_c$. On the other hand, when M=−1, the frequency decreases from the maximum frequency fmax to the minimum frequency fmin once in the length of sequence $N_c$. When M=−2, in the length of sequence $N_c$, the frequency decreases from the maximum frequency fmax to the minimum frequency fmin, and then decreases again from the maximum frequency fmax to the minimum frequency fmin. That is, when M=−2, the frequency decreases from the maximum frequency fmax to the minimum frequency fmin twice in the length of sequence $N_c$.

The chirp spread unit 12 outputs data generated by performing the spread spectrum on the modulated signal to the frame generation unit 14. In the following description, the data generated by the chirp spread unit 12 may be referred to as a data block.

Figure 3:
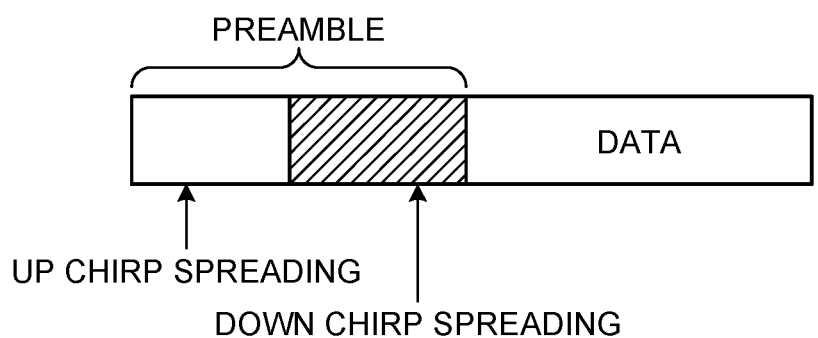
FIG. 3 is a diagram illustrating an example of a preamble generated by a preamble generation unit of the transmitter of the first embodiment.

The preamble generation unit 13 generates a preamble by performing spread spectrum on a known signal (step S103). Specifically, the preamble generation unit 13 performs the spread spectrum on the known signal using up chirp and down chirp. In the present embodiment, the up chirp is a signal generated using the generation expression of the Zadoff-Chu sequence in which M=1 in expression (1), and is a phase rotation signal in which the frequency linearly increases with time. Also, in the present embodiment, the down chirp is a signal generated using the generation expression of the Zadoff-Chu sequence in which M=−1 in expression (1), and is a phase rotation signal in which the frequency linearly decreases with time. FIG. 3 is a diagram illustrating an example of the preamble generated by the preamble generation unit 13 of the transmitter 1 of the first embodiment. As illustrated in FIG. 3, the preamble generation unit 13 generates the preamble by performing, on the known signal, up chirp spreading using the up chirp for a signal in a block corresponding to a first half of the preamble, and down chirp spreading using the down chirp for a signal in a block corresponding to a second half of the preamble.

The preamble generation unit 13 outputs the preamble generated by performing the spread spectrum to the frame generation unit 14. In the following description, the preamble generated by the preamble generation unit 13 may be referred to as a preamble block. Note that the preamble generation unit 13 may generate the preamble by performing, on the known signal, down chirp spreading using the down chirp for the signal in the block corresponding to the first half of the preamble, and up chirp spreading using the up chirp for the signal in the block corresponding to the second half of the preamble. That is, the preamble generation unit 13 may spread the first half of the preamble block with one of the up chirp or the down chirp, and spread the second half of the preamble block with the other one of the up chirp or the down chirp.

The frame generation unit 14 frames, as illustrated in FIG. 3, the data block generated by performing the spread spectrum in the chirp spread unit 12 and the preamble block generated by performing the spread spectrum in the preamble generation unit 13 (step S104). FIG. 3 illustrates an example of the preamble generated by the preamble generation unit 13 as described above, and also illustrates an example of a signal framed by the frame generation unit 14. The frame generation unit 14 outputs the framed signal to the transmission filter 15.

The transmission filter 15 performs band limitation on the signal framed by the frame generation unit 14 (step S105). The transmission filter 15 outputs a spread signal that has been subjected to band limitation to the transmission antenna 16.

The transmission antenna 16 transmits the signal that has been subjected to band limitation acquired from the transmission filter 15 (step S106).

Figure 4:
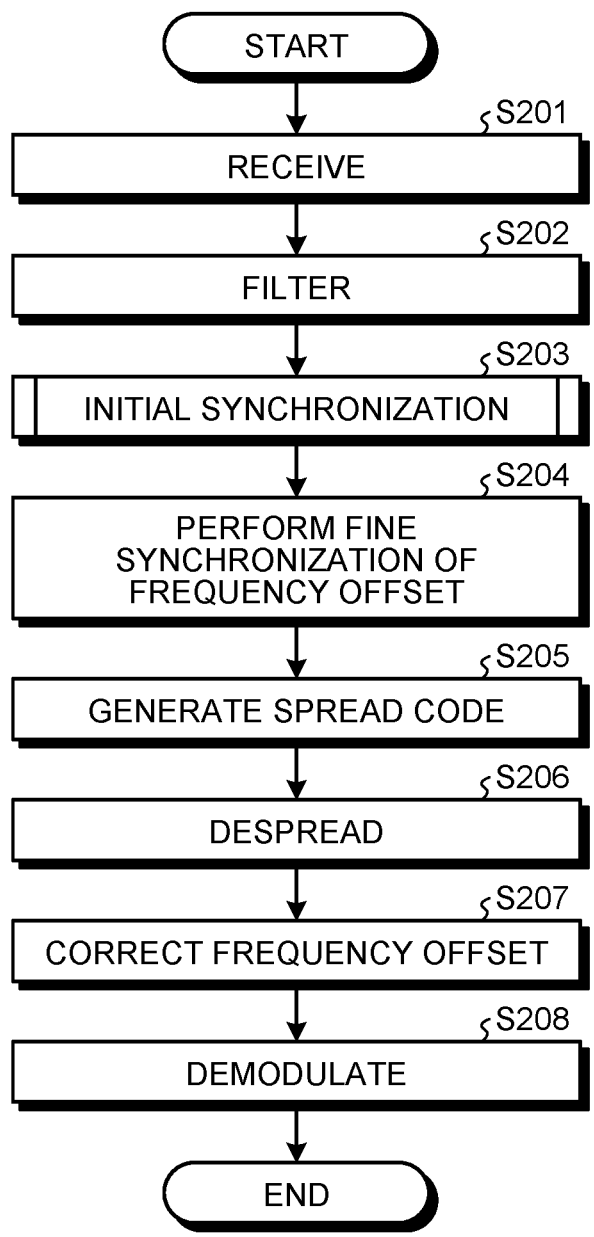
FIG. 4 is a flowchart illustrating an operation of a receiver according to the first embodiment.

Next, the configuration and operation of the receiver 2 will be described. As illustrated in FIG. 1, the receiver 2 includes a reception antenna 21, a reception filter 22, an initial synchronization unit 23, a frequency offset fine synchronization unit 24, a spread code generation unit 25, a despreading unit 26, a frequency offset correction unit 27, and a demodulation unit 28. FIG. 4 is a flowchart illustrating the operation of the receiver 2 according to the first embodiment.

The reception antenna 21 receives a signal transmitted from the transmitter 1 (step S201). The signal received by the reception antenna 21, that is, a received signal, is the signal transmitted from the transmitter 1 and is the signal including the preamble spread with the up chirp that is a spread code whose frequency increases with time and the down chirp that is a spread code whose frequency decreases with time. The reception antenna 21 outputs the received signal to the reception filter 22.

The reception filter 22 performs filtering on the received signal acquired from the reception antenna 21 (step S202). The reception filter 22 outputs the signal that has been subjected to the reception filtering to the initial synchronization unit 23 and the despreading unit 26. In the following description, the signal that has been subjected to the reception filtering may be referred to as a reception filter passed signal.

The initial synchronization unit 23 performs initial synchronization on the basis of the reception filter passed signal acquired from the reception filter 22 (step S203). In the present embodiment, as the initial synchronization, the initial synchronization unit 23 first performs synchronization of the timing of multiplication by the spread code in the transmitter 1, that is, initial acquisition. As the initial synchronization, the initial synchronization unit 23 further performs coarse frequency offset estimation on the basis of the spread code timing estimated by the initial acquisition. The coarse frequency offset estimation refers to frequency offset estimation performed with coarse accuracy as compared to the accuracy of estimating a frequency offset by the frequency offset fine synchronization unit 24 described later. The initial synchronization unit 23 outputs the spread code timing estimated by the initial acquisition to the spread code generation unit 25 as an estimated spread code timing, and outputs a result of the coarse frequency offset estimation to the frequency offset fine synchronization unit 24. Note that detailed configuration and operation of the initial synchronization unit 23 will be described later.

The frequency offset fine synchronization unit 24 performs fine synchronization of the frequency offset on the basis of the result of the coarse frequency offset estimation acquired from the initial synchronization unit 23 (step S204). The fine synchronization of the frequency offset is to correct the amount of frequency offset in a case where an error remains in the result of the coarse frequency offset estimation acquired from the initial synchronization unit 23. The frequency offset fine synchronization unit 24 outputs a corrected amount of frequency offset to the frequency offset correction unit 27.

The spread code generation unit 25 generates a spread code for despreading on the basis of the estimated spread code timing acquired from the initial synchronization unit 23 (step S205). The spread code generation unit 25 outputs the generated spread code to the despreading unit 26.

The despreading unit 26 multiplies the reception filter passed signal acquired from the reception filter 22 by a complex conjugate of the spread code acquired from the spread code generation unit 25, thereby despreading the reception filter passed signal (step S206). The despreading unit 26 outputs the signal that has been despread to the frequency offset correction unit 27.

In a case where the frequency offset remains in the despread signal acquired from the despreading unit 26, the frequency offset correction unit 27 corrects the frequency offset with the corrected amount of frequency offset acquired from the frequency offset fine synchronization unit 24 (step S207). The frequency offset correction unit 27 outputs the signal that has been subjected to the frequency offset correction to the demodulation unit 28.

The demodulation unit 28 demodulates the signal that has been subjected to the frequency offset correction acquired from the frequency offset correction unit 27 (step S208).

Figure 5:
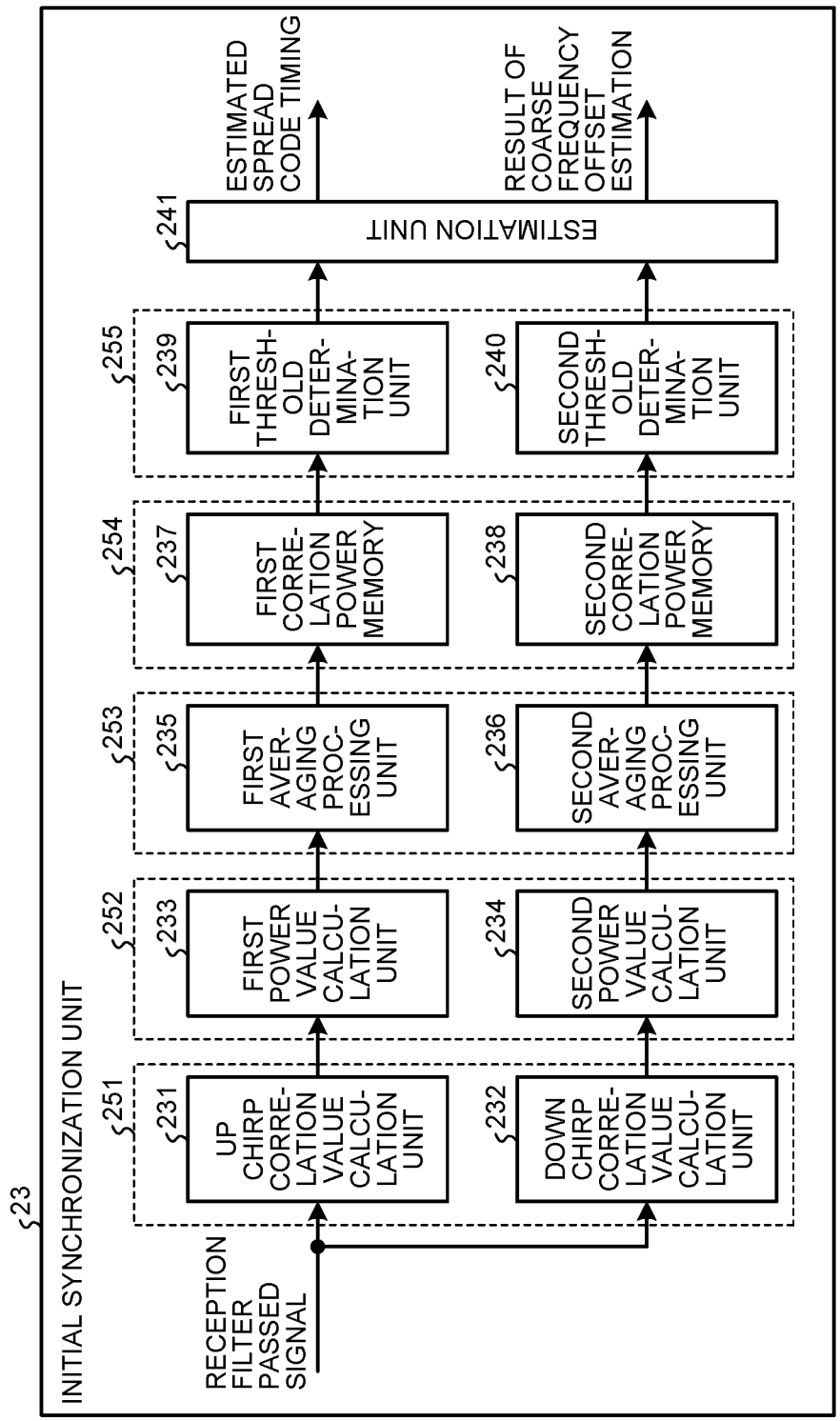
FIG. 5 is a diagram illustrating an example of a configuration of an initial synchronization unit included in the receiver according to the first embodiment.
Figure 6:
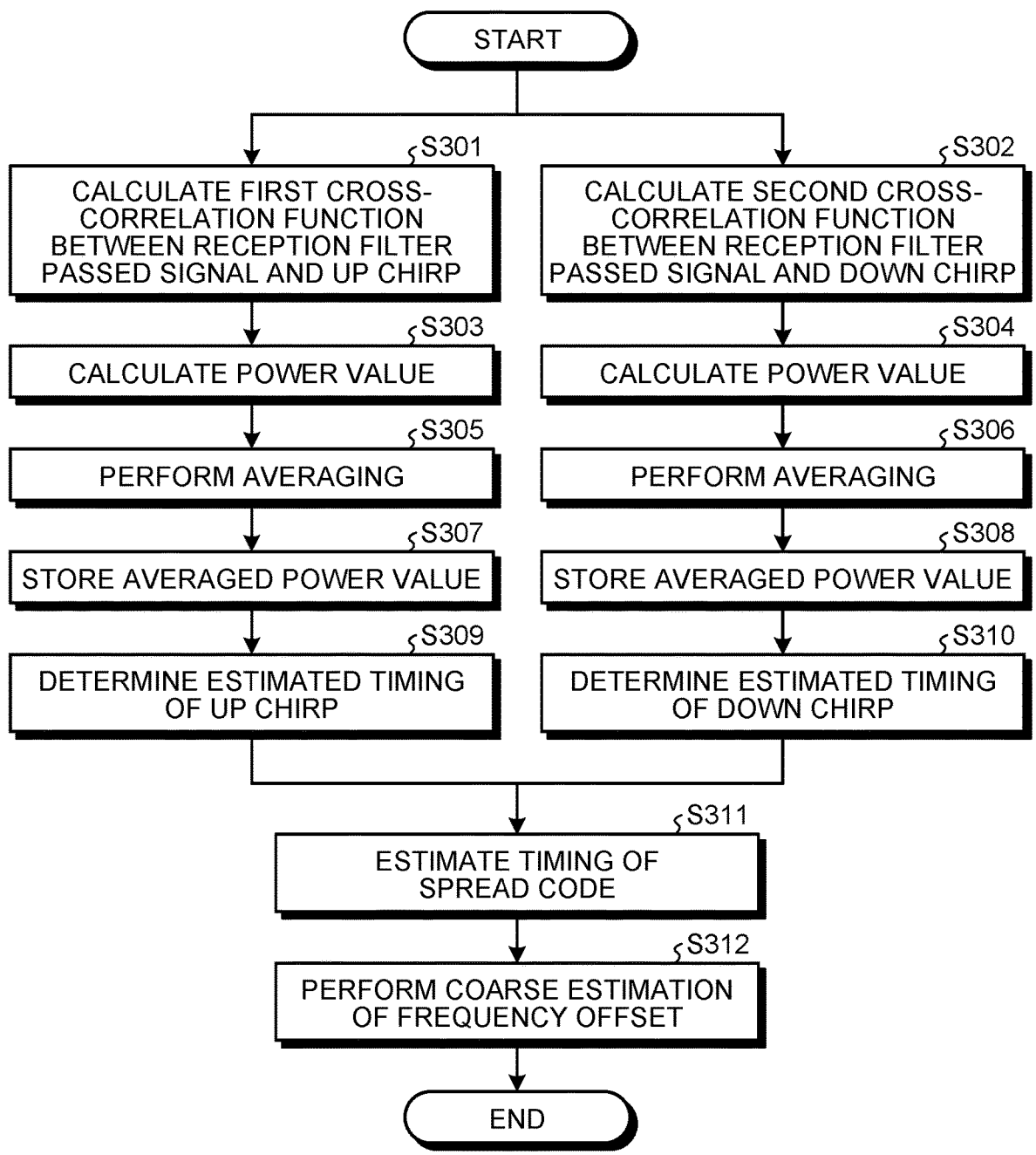
FIG. 6 is a flowchart illustrating an operation of the initial synchronization unit included in the receiver according to the first embodiment.

Next, the configuration and operation of the initial synchronization unit 23 included in the receiver 2 will be described in detail. FIG. 5 is a diagram illustrating an example of the configuration of the initial synchronization unit 23 included in the receiver 2 according to the first embodiment. As illustrated in FIG. 5, the initial synchronization unit 23 includes an up chirp correlation value calculation unit 231, a down chirp correlation value calculation unit 232, a first power value calculation unit 233, a second power value calculation unit 234, a first averaging processing unit 235, a second averaging processing unit 236, a first correlation power memory 237, a second correlation power memory 238, a first threshold determination unit 239, a second threshold determination unit 240, and an estimation unit 241. Note that the up chirp correlation value calculation unit 231 and the down chirp correlation value calculation unit 232 form a correlation value calculation unit 251. The first power value calculation unit 233 and the second power value calculation unit 234 form a power value calculation unit 252. The first averaging processing unit 235 and the second averaging processing unit 236 form an averaging processing unit 253. The first correlation power memory 237 and the second correlation power memory 238 form a correlation power memory 254. The first threshold determination unit 239 and the second threshold determination unit 240 form a threshold determination unit 255. FIG. 6 is a flowchart illustrating the operation of the initial synchronization unit 23 included in the receiver 2 according to the first embodiment. The flowchart illustrated in FIG. 6 illustrates details of the operation in step S203 of the flowchart illustrated in FIG. 4.

The up chirp correlation value calculation unit 231 uses a matched filter (hereinafter referred to as an MF) to calculate a cross-correlation function between the reception filter passed signal acquired from the reception filter 22 and the up chirp used for the spread spectrum by the preamble generation unit 13 of the transmitter 1 (step S301). The cross-correlation function calculated by the up chirp correlation value calculation unit 231 is set as a first cross-correlation function. The up chirp correlation value calculation unit 231 outputs the first cross-correlation function obtained by the calculation to the first power value calculation unit 233.

The down chirp correlation value calculation unit 232 uses the MF to calculate a cross-correlation function between the reception filter passed signal acquired from the first reception filter 22 and the down chirp used for the spread spectrum by the preamble generation unit 13 of the transmitter 1 (step S302). The cross-correlation function calculated by the down chirp correlation value calculation unit 232 is set as a second cross-correlation function. The down chirp correlation value calculation unit 232 outputs the second cross-correlation function obtained by the calculation to the second power value calculation unit 234. Note that the initial synchronization unit 23 performs the operation of the down chirp correlation value calculation unit 232 in parallel with the operation of the up chirp correlation value calculation unit 231.

The first power value calculation unit 233 calculates a power value by squaring an absolute value of the first cross-correlation function acquired from the up chirp correlation value calculation unit 231 (step S303). The power value calculated by the first power value calculation unit 233 is set as a first power value. The first power value calculation unit 233 outputs the first power value obtained by the calculation to the first averaging processing unit 235. Likewise, the second power value calculation unit 234 calculates a power value by squaring an absolute value of the second cross-correlation function acquired from the down chirp correlation value calculation unit 232 (step S304). The power value calculated by the second power value calculation unit 234 is set as a second power value. The second power value calculation unit 234 outputs the second power value obtained by the calculation to the second averaging processing unit 236. Note that the initial synchronization unit 23 performs the operation of the second power value calculation unit 234 in parallel with the operation of the first power value calculation unit 233.

The first averaging processing unit 235 averages the first power values acquired from the first power value calculation unit 233 at each sample timing. Specifically, the first averaging processing unit 235 performs averaging by using the first power value acquired from the first power value calculation unit 233, and the first power value previously acquired from the first power value calculation unit 233 at the same sample timing in the previous block (step S305). In the present embodiment, one block corresponds to the length of spread code $N_c \times$the number of oversamples $N_{ovs}$, and the sample timing is one element of k=1 to $N_c \times N_{ovs}$. The first averaging processing unit 235 stores the first power value averaged at each sample timing in the first correlation power memory 237. Similarly, the second averaging processing unit 236 averages the second power values acquired from the second power value calculation unit 234 at each sample timing. Specifically, the second averaging processing unit 236 performs averaging by using the second power value acquired from the second power value calculation unit 234, and the second power value previously acquired from the second power value calculation unit 234 at the same sample timing in the previous block (step S306). The second averaging processing unit 236 stores the second power value averaged at each sample timing in the second correlation power memory 238. Note that the initial synchronization unit 23 performs the operation of the second averaging processing unit 236 in parallel with the operation of the first averaging processing unit 235.

The first correlation power memory 237 and the second correlation power memory 238 are configured to be able to store the power values at the sample timings for one period of the spread code, that is, the power values corresponding in number to the length of spread code $N_c \times$the number of oversamples $N_{ovs}$. The first correlation power memory 237 stores the averaged power values acquired from the first averaging processing unit 235 for the length of spread code $N_c \times$the number of oversamples $N_{ovs}$, that is, for the period of one block (step S307). Similarly, the second correlation power memory 238 stores the averaged power values acquired from the second averaging processing unit 236 for the length of spread code $N_c \times$the number of oversamples $N_{ovs}$, that is, for the period of one block (step S308). Here, in the initial synchronization unit 23, the processing up to the first averaging processing unit 235 and the second averaging processing unit 236 is the operation performed in sample time units, but the processing of the first correlation power memory 237 and the second correlation power memory 238 and the processing subsequent thereto are changed to the operation performed in block time units.

The first threshold determination unit 239 determines an estimated up chirp timing n1, which is a first estimated timing for the up chirp, from the first power values for one period of the spread code. Specifically, the first threshold determination unit 239 detects a first maximum power value having the maximum power value from the averaged power values for the period of one block stored in the first correlation power memory 237, and compares the detected first maximum power value with a first threshold. If the first maximum power value exceeds the first threshold, the first threshold determination unit 239 determines that the sample timing corresponding to the first maximum power value is the estimated up chirp timing n1 (step S309). The first threshold determination unit 239 outputs the estimated up chirp timing n1 to the estimation unit 241.

The second threshold determination unit 240 determines an estimated down chirp timing n2, which is a second estimated timing for the down chirp, from the second power values for one period of the spread code. Specifically, the second threshold determination unit 240 detects a second maximum power value having the maximum power value from the averaged power values for the period of one block stored in the second correlation power memory 238, and compares the detected second maximum power value with a second threshold. If the second maximum power value exceeds the second threshold, the second threshold determination unit 240 determines that the sample timing corresponding to the second maximum power value is the estimated down chirp timing n2 (step S310). The second threshold determination unit 240 outputs the estimated down chirp timing n2 to the estimation unit 241. Note that the initial synchronization unit 23 performs the operation of the second threshold determination unit 240 in parallel with the operation of the first threshold determination unit 239. Although the estimated up chirp timing n1 from the first threshold determination unit 239 and the estimated down chirp timing n2 from the second threshold determination unit 240 may be output at the same time, it should be noted that the output of one of them is delayed by a plurality of blocks.

Figure 7:
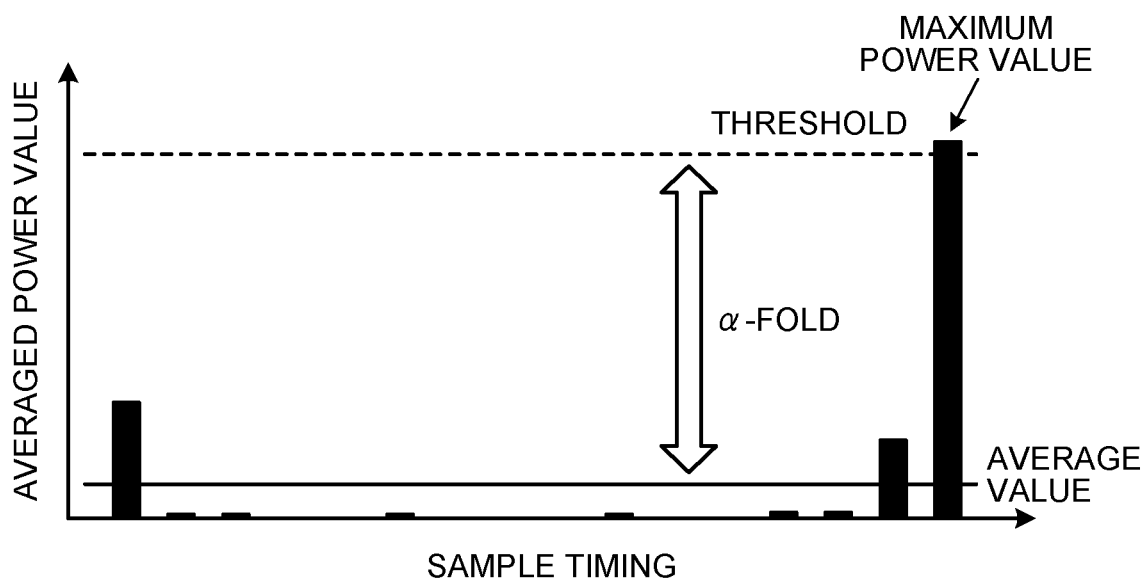
FIG. 7 is a diagram illustrating an image of threshold setting in a first threshold determination unit and a second threshold determination unit according to the first embodiment.

The following method is an example of the method of threshold determination by the first threshold determination unit 239 and the second threshold determination unit 240. The first threshold determination unit 239 calculates an average value of the power values for the period of one block read from the first correlation power memory 237, and sets a value obtained by multiplying the average value by a constant α as a threshold. Similarly, the second threshold determination unit 240 calculates an average value of the power values for the period of one block read from the second correlation power memory 238, and sets a value obtained by multiplying the average value by the constant α as a threshold. Note that 1≤α. FIG. 7 is a diagram illustrating an image of threshold setting by the first threshold determination unit 239 and the second threshold determination unit 240 according to the first embodiment. In FIG. 7, the horizontal axis represents the sample timing, and the vertical axis represents the averaged power value. As illustrated in FIG. 7, as the value of the constant α is set to be larger, the first threshold determination unit 239 and the second threshold determination unit 240 can reduce false alarms for establishing an erroneous synchronization point, but timing detection tends to take time. On the other hand, as the value of the constant α is set to be smaller, the first threshold determination unit 239 and the second threshold determination unit 240 can shorten the time for timing detection, but false alarms tend to increase.

The estimation unit 241 detects an intermediate timing n0 between the estimated up chirp timing n1 and the estimated down chirp timing n2 by using the estimated up chirp timing n1 acquired from the first threshold determination unit 239 and the estimated down chirp timing n2 acquired from the second threshold determination unit 240. The estimation unit 241 rounds off the intermediate timing n0 when the intermediate timing n0 is a decimal. The estimation unit 241 estimates the intermediate timing n0 as the spread code timing in the transmitter 1 (step S311). Furthermore, the estimation unit 241 performs coarse estimation of the frequency offset between the transmitter 1 and the receiver 2 from a difference between the estimated up chirp timing n1 and the estimated down chirp timing n2 as in expression (2) (step S312).

$$(n2 - n1)/2 \times (\text{symbol rate})/N_{ovs} \qquad (2)$$

The estimation unit 241 outputs the spread code timing estimated to the spread code generation unit 25 as an estimated spread code timing. The estimation unit 241 further outputs a result of the coarse frequency offset estimation, which is a result of performing the coarse estimation of the frequency offset, to the frequency offset fine synchronization unit 24.

Note that in the present embodiment, the initial synchronization unit 23 of the receiver 2 includes the first averaging processing unit 235 and the second averaging processing unit 236, but the present disclosure is not limited to such a configuration. The initial synchronization unit 23 may be configured not to include the first averaging processing unit 235 and the second averaging processing unit 236. In this case, the first power value calculation unit 233 stores the first power values obtained by the calculation in the first correlation power memory 237, and the second power value calculation unit 234 stores the second power values obtained by the calculation in the second correlation power memory 238. The first threshold determination unit 239 determines the estimated up chirp timing n1 from the first power values for one period of the spread code stored in the first correlation power memory 237. The second threshold determination unit 240 determines the estimated down chirp timing n2 from the second power values for one period of the spread code stored in the second correlation power memory 238.

Next, a hardware configuration of the receiver 2 will be described. In the receiver 2, the reception antenna 21 is implemented by an antenna device. The reception filter 22 is implemented by a filter circuit. The initial synchronization unit 23, the frequency offset fine synchronization unit 24, the spread code generation unit 25, the despreading unit 26, the frequency offset correction unit 27, and the demodulation unit 28 are implemented by processing circuitry. The processing circuitry may include a memory and a processor executing a program stored in the memory, or may include dedicated hardware. The processing circuitry is also referred to as a control circuit.

Figure 8:
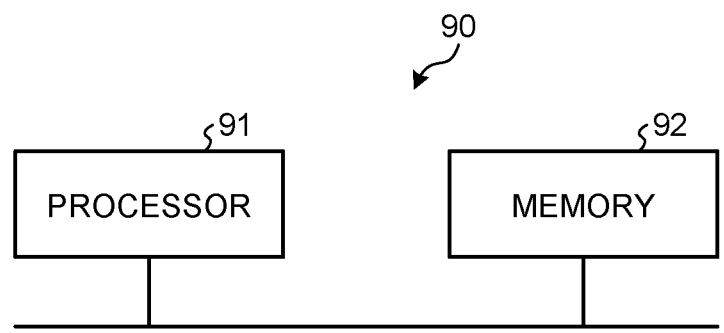
FIG. 8 is a diagram illustrating an example of a configuration of processing circuitry in a case where the processing circuitry included in the receiver according to the first embodiment is implemented by a processor and a memory.

FIG. 8 is a diagram illustrating an example of a configuration of processing circuitry 90 in a case where the processing circuitry included in the receiver 2 according to the first embodiment is implemented by a processor and a memory. The processing circuitry 90 illustrated in FIG. 8 is the control circuit, and includes a processor 91 and a memory 92. When the processing circuitry 90 incudes the processor 91 and the memory 92, each function of the processing circuitry 90 is implemented by software, firmware, or a combination of software and firmware. The software or firmware is described as a program and stored in the memory 92. The processing circuitry 90 implements each function by the processor 91 reading and executing the program stored in the memory 92. That is, the processing circuitry 90 includes the memory 92 for storing the program that results in the execution of the processing of the receiver 2. It can also be said that this program is a program for causing the receiver 2 to execute each function implemented by the processing circuitry 90. This program may be provided by a storage medium in which the program is stored, or may be provided by another means such as a communication medium.

The above program can also be said to be a program that causes the receiver 2 to execute: a first step in which the correlation value calculation unit 251 calculates a first cross-correlation function between a received signal and an up chirp and a second cross-correlation function between the received signal and a down chirp, the received signal being a signal transmitted from the transmitter 1 and having a preamble spread with the up chirp signal whose frequency increases with time and the down chirp signal whose frequency decreases with time; a second step in which the power value calculation unit 252 calculates a first power value of the first cross-correlation function, calculates a second power value of the second cross-correlation function, and stores the first power value and the second power value in the correlation power memory 254; a third step in which the threshold determination unit 255 determines a first estimated timing for the up chirp from the first power values for one period of a spread code stored in the correlation power memory 254, and determines a second estimated timing for the down chirp from the second power values for one period of the spread code stored in the correlation power memory 254; and a fourth step in which the estimation unit 241 estimates a spread code timing of the transmitter 1 using the first estimated timing and the second estimated timing, and performs coarse estimation of a frequency offset with respect to the transmitter 1.

Here, the processor 91 is, for example, a central processing unit (CPU), a processing unit, an arithmetic unit, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

Figure 9:
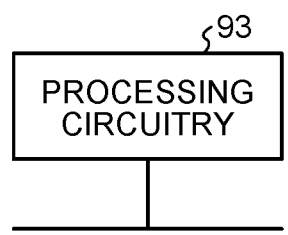
FIG. 9 is a diagram illustrating an example of processing circuitry in a case where the processing circuitry included in the receiver according to the first embodiment includes dedicated hardware.

FIG. 9 is a diagram illustrating an example of processing circuitry 93 in a case where the processing circuitry included in the receiver 2 according to the first embodiment includes dedicated hardware. The processing circuitry 93 illustrated in FIG. 9 corresponds to, for example, a single circuit, a complex circuit, a programmed processor, a parallel-programmed processor, an application specific integrated circuit (ASIC), a field programmable gate array (FPGA), or a combination thereof. The processing circuitry may be implemented partly by dedicated hardware and partly by software or firmware. The processing circuitry can thus implement the aforementioned functions by the dedicated hardware, software, firmware, or a combination thereof.

While the hardware configuration of the receiver 2 has been described, the transmitter 1 has a similar hardware configuration. In the transmitter 1, the transmission antenna 16 is implemented by an antenna device. The transmission filter 15 is implemented by a filter circuit. The modulation unit 11, the chirp spread unit 12, the preamble generation unit 13, and the frame generation unit 14 are implemented by processing circuitry. The processing circuitry may include a memory and a processor executing a program stored in the memory, or may include dedicated hardware.

The above program can also be said to be a program that causes the transmitter 1 to execute: a first step in which the chirp spread unit 12 spreads a data signal with a chirp that is a spread code; a second step in which the preamble generation unit 13 spreads a known signal with an up chirp whose frequency increases with time and a down chirp whose frequency decreases with time; and a third step in which the frame generation unit 14 frames a data block that is spread and generated in the chirp spread unit 12 and a preamble block that is spread and generated in the preamble generation unit 13.

As described above, in the communication system 3 of the present embodiment, the preamble generation unit 13 of the transmitter 1 performs up chirp spreading in the block corresponding to the first half of the preamble, and performs down chirp spreading in the block corresponding to the second half of the preamble. The initial synchronization unit 23 of the receiver 2 detects the estimated up chirp timing n1 and the estimated down chirp timing n2, estimates the intermediate timing n0 between the two estimated timings as the spread code timing, and performs the coarse estimation of the frequency offset from the difference between the two estimated timings. This utilizes the occurrence of a timing shift in an opposite direction in up chirp spreading and down chirp spreading by the frequency offset, and the initial synchronization unit 23 can cancel the timing shift occurring in the opposite direction, that is, remove the timing shift, by obtaining the intermediate timing n0 and can estimate the spread code timing and perform the coarse frequency offset estimation even in an environment where there is a large frequency offset.

The accuracy of the coarse frequency offset estimation depends on the accuracy of estimation of the spread code timing. For example, in a case where the accuracy of estimation of the spread code timing is within one sample, the accuracy of the coarse frequency offset estimation corresponds to an amount of frequency offset that causes the timing shift off by one sample. After estimating the spread code timing and performing the coarse estimation of the frequency offset as the initial synchronization, the receiver 2 performs the frequency offset correction and corrects the frequency offset error remaining in the initial synchronization. The receiver 2 can thus estimate the spread code timing and the frequency offset even in an environment where there is a large frequency offset while preventing or reducing a processing delay and preventing or reducing an increase in the circuit scale.

Note that the present embodiment has described, as an example, the case where the Zadoff-Chu sequence according to expression (1) is used by the chirp spread unit 12 and the preamble generation unit 13 of the transmitter 1, but the present disclosure is not limited thereto. Even in a case where the chirp spread unit 12 and the preamble generation unit 13 of the transmitter 1 use, for the spread code, another phase rotation sequence such as a Zadoff-Chu sequence in which the center frequencies are matched between the up chirp and the down chirp, or a constant amplitude zero auto correlation (CAZAC) sequence, the spread code timing can be estimated. In addition, the chirp spread unit 12 and the preamble generation unit 13 of the transmitter 1 can use a Zadoff-Chu sequence in which the sequence parameter is not M=1, and can perform synchronization with reduced inter-user interference by using a sequence in which the sequence parameter is changed for each user.

Moreover, in the present embodiment, the preamble generation unit 13 of the transmitter 1 divides the preamble into the first half being the block subjected to up chirp spreading and the second half being the block subjected to down chirp spreading, but the preamble configuration is not limited thereto. The preamble generation unit 13 of the transmitter 1 may be configured to alternately perform up chirp spreading and down chirp spreading for every one to several blocks, for example. That is, the preamble generation unit 13 may divide the preamble block into a plurality of blocks, and alternately arrange the block spread by the up chirp and the block spread by the down chirp. In this case, the receiver 2 can double the gap between the blocks subjected to up chirp spreading or down chirp spreading as compared to the case where up chirp spreading and down chirp spreading are performed in the first half and the second half, and can improve the accuracy of estimation of the frequency offset fine synchronization using multiple open loop automatic frequency control (AFC).

Moreover, in the present embodiment, the initial synchronization unit 23 of the receiver 2 is configured to perform averaging with the power value at the same sample timing in the previous block, but the present disclosure is not limited thereto. The initial synchronization unit 23 may perform averaging at the same sample timing in all preamble blocks subjected to the same chirp spreading. For example, in a case where up chirp spreading is performed in first, third, and fifth blocks and down chirp spreading is performed in second, fourth, and sixth blocks, the first averaging processing unit 235 may perform averaging at the same sample timing in the first, third, and fifth blocks of the input signal, and the second averaging processing unit 236 may perform averaging at the same sample timing in the second, fourth, and sixth blocks of the input signal. As a result, the receiver 2 can prevent or reduce noise and improve synchronization accuracy.

Second Embodiment

In a second embodiment, a transmitter performs space time code (hereinafter referred to as space time block code (STBC) coding) as transmit diversity after modulating transmit data by the modulation unit 11. A receiver successively performs timing synchronization of spread codes and combining of STBC transmit diversity in the initial synchronization, thereby improving estimation accuracy while preventing or reducing an increase in the circuit scale. Differences from the first embodiment will be described.

Figure 10:
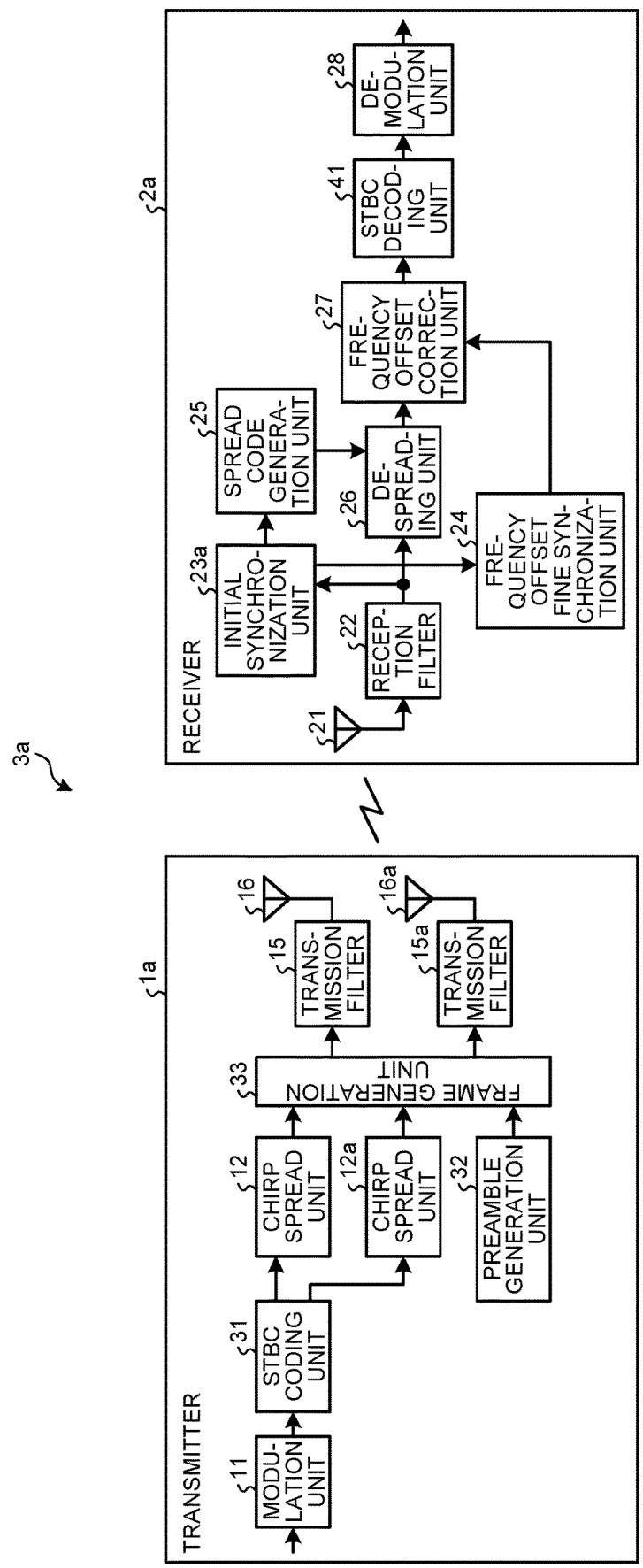
FIG. 10 is a diagram illustrating an example of a configuration of a communication system according to a second embodiment.

FIG. 10 is a diagram illustrating an example of a configuration of a communication system 3a according to the second embodiment. The communication system 3a includes a transmitter 1a and a receiver 2a.

Figure 11:
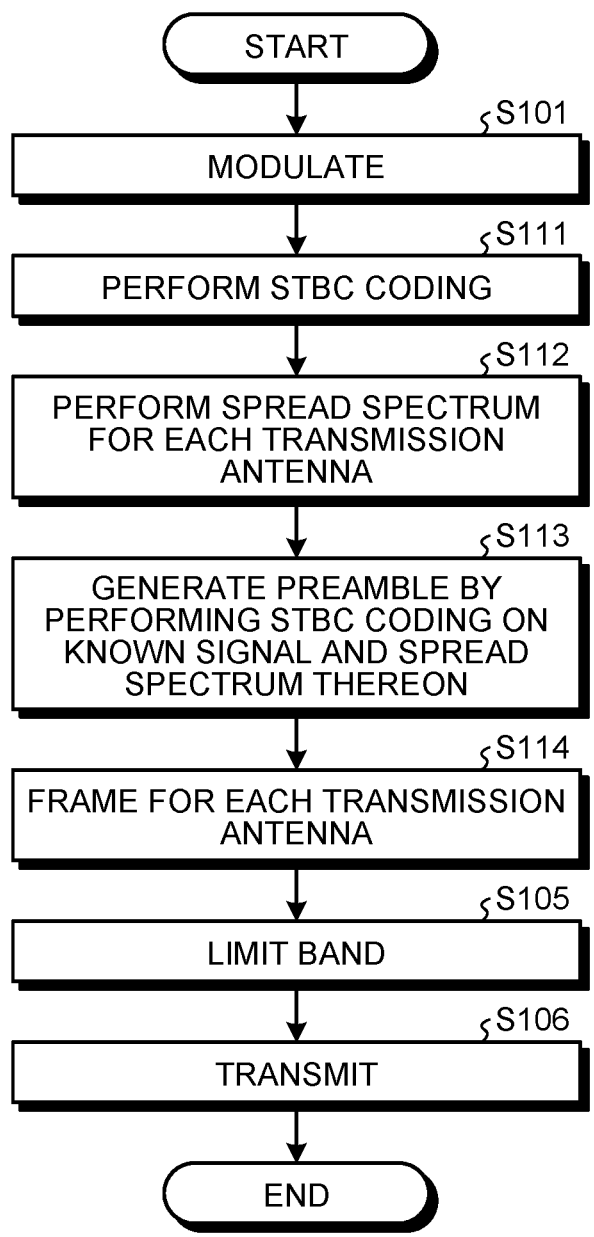
FIG. 11 is a flowchart illustrating an operation of a transmitter according to the second embodiment.

First, the configuration and operation of the transmitter 1a will be described. As illustrated in FIG. 10, the transmitter 1a includes the modulation unit 11, an STBC coding unit 31, chirp spread units 12 and 12a, a preamble generation unit 32, a frame generation unit 33, transmission filters 15 and 15a, and transmission antennas 16 and 16a. FIG. 11 is a flowchart illustrating the operation of the transmitter 1a according to the second embodiment.

After step S101, the STBC coding unit 31 performs STBC coding on modulated signals acquired from the modulation unit 11. Specifically, in a case where the STBC coding unit 31 successively acquires modulated signals s1 and s2 from the modulation unit 11, the STBC coding unit performs STBC coding using the modulated signals s1 and s2 as expressed by expression (3) (step S111).

[Expression 1]
$$\begin{pmatrix} s1 & -s2^* \\ s2 & s1^* \end{pmatrix} \quad (3)$$

In expression (3), "( )" represents a complex conjugate. In the matrix expressed by expression (3), the row direction corresponds to the transmission antennas 16 and 16a included in the transmitter 1a, and the column direction corresponds to time. That is, the STBC coding unit 31 performs STBC coding such that, at time t1, the modulated signal s1 is transmitted from the first transmission antenna and the modulated signal s2 is transmitted from the second transmission antenna, and at time t2, a modulated signal $-s2^*$ is transmitted from the first transmission antenna and a modulated signal $s1^*$ is transmitted from the second transmission antenna. Here, the first transmission antenna corresponds to the transmission antenna 16, and the second transmission antenna corresponds to the transmission antenna 16a.

The chirp spread units 12 and 12a perform spread spectrum for each transmission antenna, that is, on the signals to be transmitted from the corresponding transmission antennas (step S112). Specifically, the chirp spread unit 12 employs a method similar to that of the first embodiment to perform the spread spectrum using a chirp signal on the signals subjected to STBC coding by the STBC coding unit 31 and corresponding to the first row of the matrix expressed by expression (3), that is, the signals to be transmitted from the transmission antenna 16. The chirp spread unit 12 outputs data generated by performing the spread spectrum to the frame generation unit 33. The chirp spread unit 12a employs a method similar to that of the chirp spread unit 12 to perform the spread spectrum using a chirp signal on the signals subjected to STBC coding by the STBC coding unit 31 and corresponding to the second row of the matrix expressed by expression (3), that is, the signals to be transmitted from the transmission antenna 16a. The chirp spread unit 12a outputs data generated by performing the spread spectrum to the frame generation unit 33. Note that the spread codes used for spreading by the chirp spread unit 12 and the chirp spread unit 12a are assumed to be the same. The configuration of the chirp spread unit 12a is assumed to be similar to the configuration of the chirp spread unit 12.

The preamble generation unit 32 employs a method similar to expression (3) to perform STBC coding on a known signal, and then performs spread spectrum thereon by up chirp and down chirp to generate a preamble (step S113). It is assumed that the preamble generation unit 32 uses a common code for the spread code of two transmission antennas at the same time. The two transmission antennas refer to the transmission antennas 16 and 16a in the present embodiment. As with the first embodiment, the preamble generation unit 32 of the present embodiment may spread the signal in the block corresponding to the first half of the preamble by the up chirp, and spread the signal in the block corresponding to the second half of the preamble by the down chirp. Also, for every two blocks subjected to STBC coding, the preamble generation unit 32 may spread one of the blocks by the up chirp and spread the other block by the down chirp.

The frame generation unit 33 frames a data block and a preamble block for each transmission antenna (step S114). Specifically, the frame generation unit 33 frames the preamble block generated by the preamble generation unit 32 to be transmitted from the transmission antenna 16, and the data block generated by the chirp spread unit 12. The frame generation unit 33 outputs the framed signal to the transmission filter 15. Similarly, the frame generation unit 33 frames the preamble block generated by the preamble generation unit 32 to be transmitted from the transmission antenna 16a, and the data block generated by the chirp spread unit 12a. The frame generation unit 33 outputs the framed signal to the transmission filter 15a.

After that, the operation of the transmission filters 15 and 15a is similar to the operation of the transmission filter 15 of the first embodiment (step S105), and the operation of the transmission antennas 16 and 16a is similar to the operation of the transmission antenna 16 of the first embodiment (step S106). The configuration of the transmission filter 15a is assumed to be similar to the configuration of the transmission filter 15, and the configuration of the transmission antenna 16a is assumed to be similar to the configuration of the transmission antenna 16.

Figure 12:
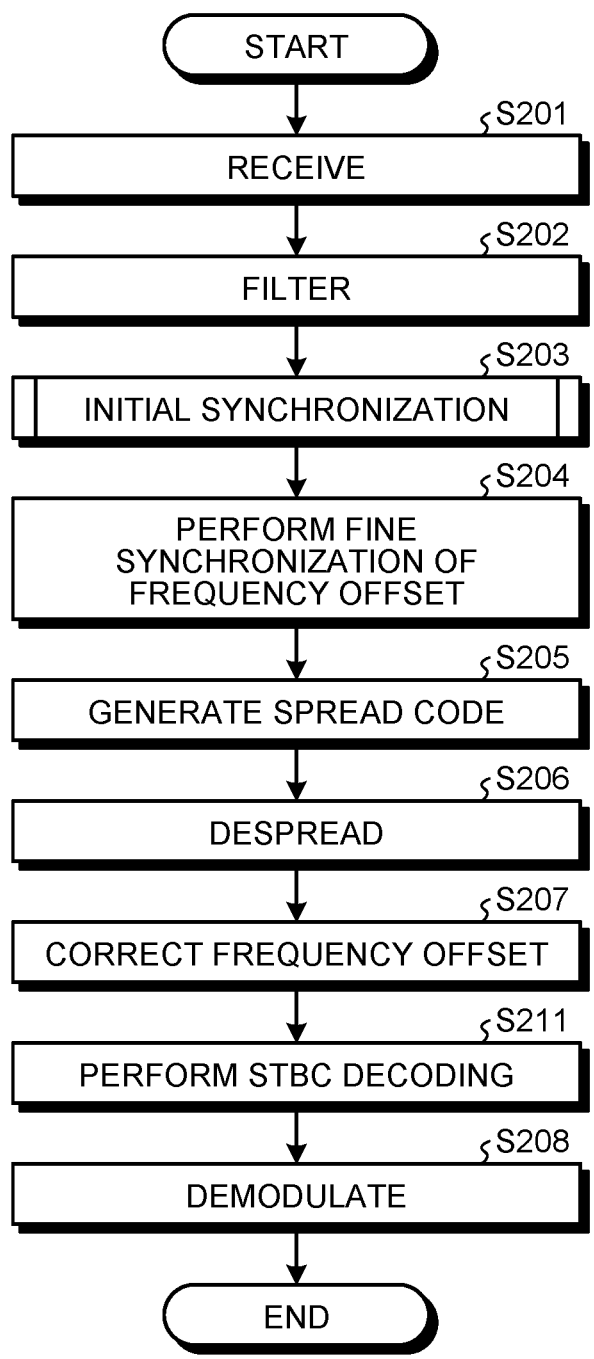
FIG. 12 is a flowchart illustrating an operation of a receiver according to the second embodiment.

Next, the configuration and operation of the receiver 2a will be described. The receiver 2a of the second embodiment illustrated in FIG. 10 is obtained by replacing, with an initial synchronization unit 23a, the initial synchronization unit 23 in the receiver 2 of the first embodiment illustrated in FIG. 1 and further adding thereto an STBC decoding unit 41. The STBC decoding unit 41 performs STBC decoding well known to those skilled in the art on a signal that has been subjected to frequency offset correction acquired from the frequency offset correction unit 27. The STBC decoding unit 41 outputs the signal that has been subjected to STBC decoding to the demodulation unit 28. FIG. 12 is a flowchart illustrating the operation of the receiver 2a according to the second embodiment. The flow of the operation of the receiver 2a includes performing frequency offset correction (step S207), then performing STBC decoding (step S211), and performing demodulation (step S208). The rest of the operation of the receiver 2a is similar to the operation of the receiver 2 of the first embodiment.

Figure 13:
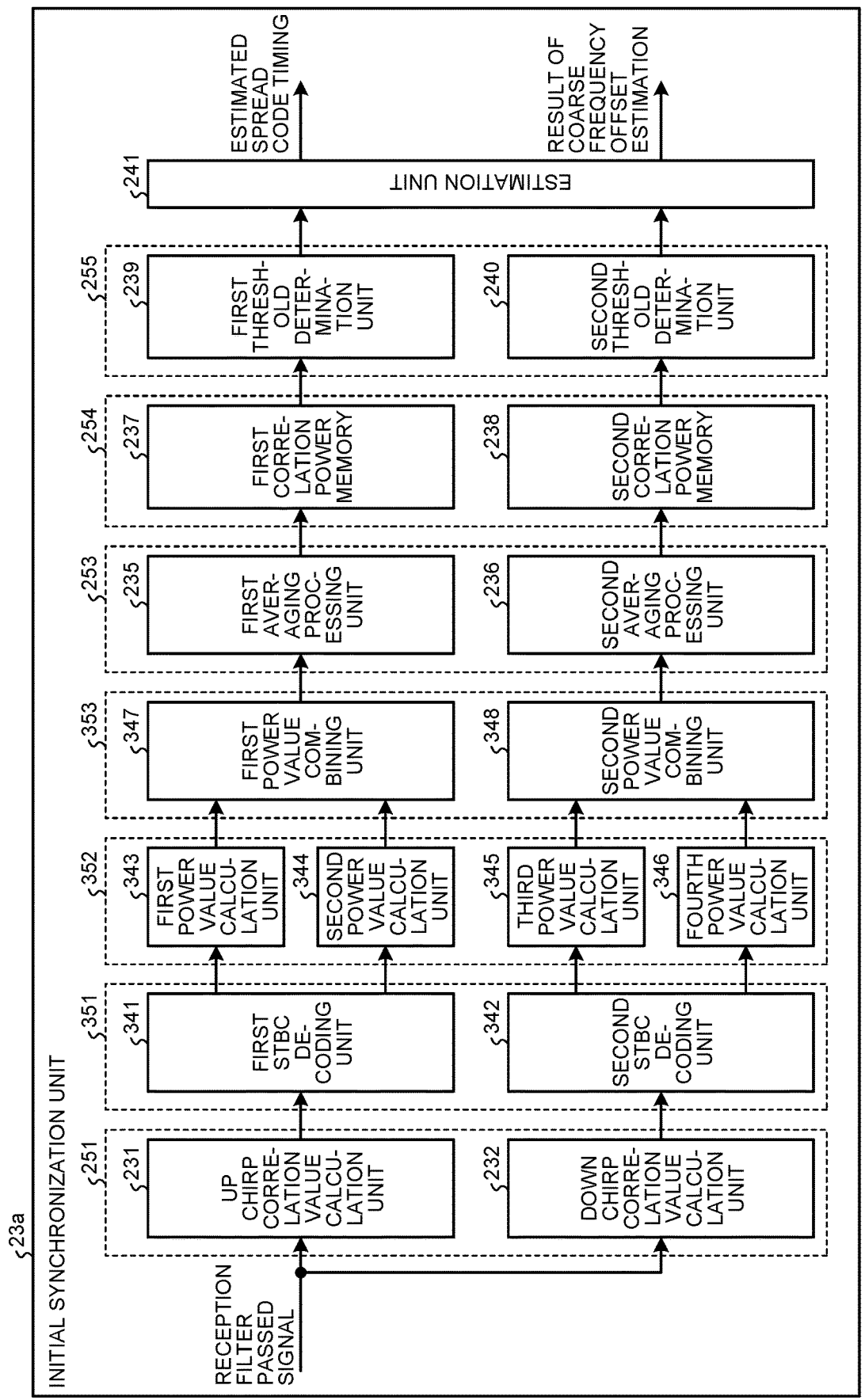
FIG. 13 is a diagram illustrating an example of a configuration of an initial synchronization unit included in the receiver according to the second embodiment.
Figure 14:
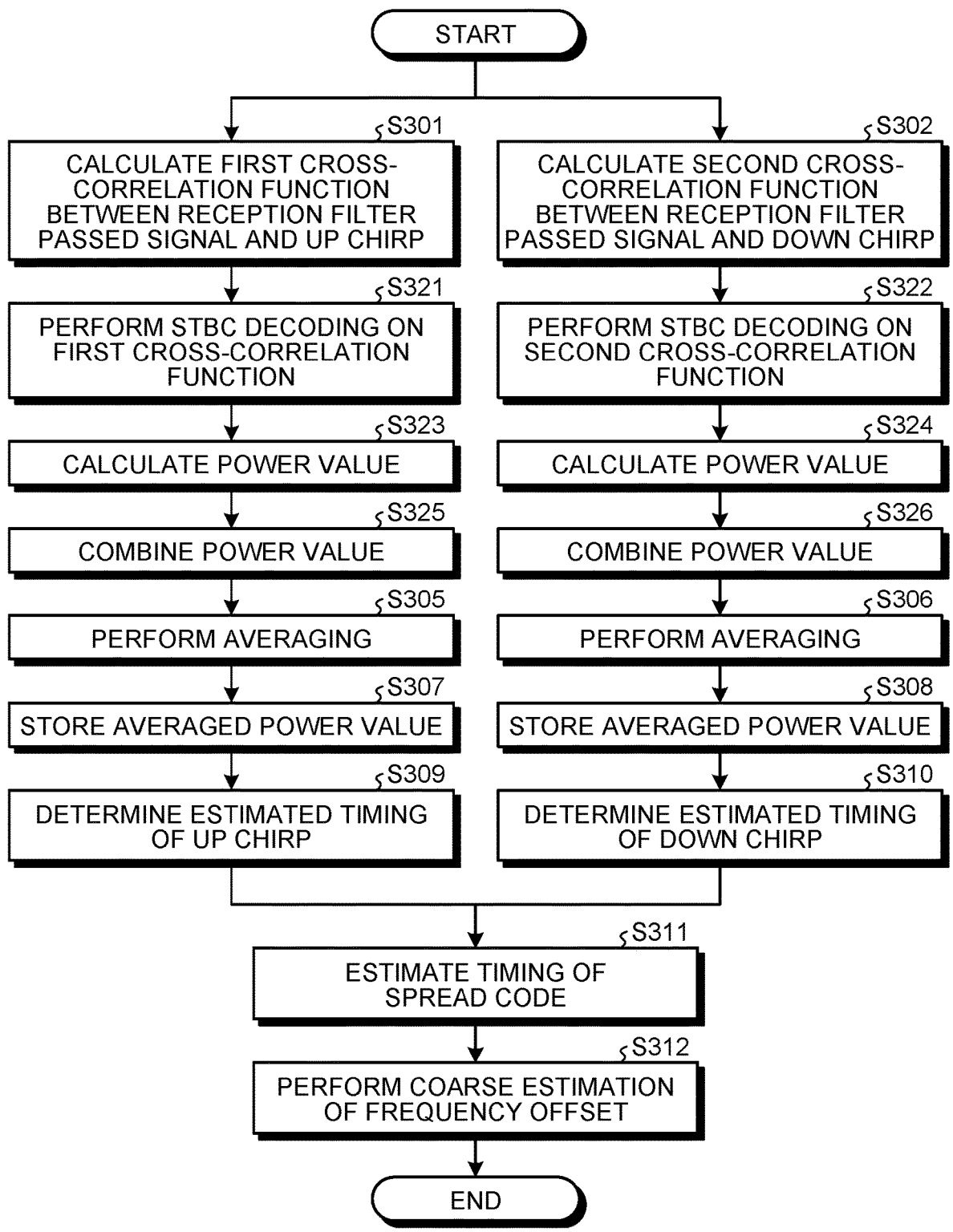
FIG. 14 is a flowchart illustrating an operation of the initial synchronization unit included in the receiver according to the second embodiment.

The configuration and operation of the initial synchronization unit 23a included in the receiver 2a will be described in detail. FIG. 13 is a diagram illustrating an example of the configuration of the initial synchronization unit 23a included in the receiver 2a according to the second embodiment. The initial synchronization unit 23a of the second embodiment illustrated in FIG. 13 is obtained by removing the first power value calculation unit 233 and the second power value calculation unit 234 from the initial synchronization unit 23 of the first embodiment illustrated in FIG. 5, and adding thereto a first STBC decoding unit 341, a second STBC decoding unit 342, a first power value calculation unit 343, a second power value calculation unit 344, a third power value calculation unit 345, a fourth power value calculation unit 346, a first power value combining unit 347, and a second power value combining unit 348. Note that the first STBC decoding unit 341 and the second STBC decoding unit 342 form an STBC decoding unit 351. The first power value calculation unit 343, the second power value calculation unit 344, the third power value calculation unit 345, and the fourth power value calculation unit 346 form a power value calculation unit 352. The first power value combining unit 347 and the second power value combining unit 348 form a power value combining unit 353. FIG. 14 is a flowchart illustrating the operation of the initial synchronization unit 23a included in the receiver 2a according to the second embodiment. The flowchart illustrated in FIG. 14 illustrates details of the operation in step S203 of the flowchart illustrated in FIG. 12.

In the second embodiment, the reception antenna 21 of the receiver 2a receives a signal that has been subjected to STBC coding in the transmitter 1a and transmitted from the plurality of transmission antennas 16 and 16a. The reception filter 22 performs filtering on the received signal acquired from the reception antenna 21. The up chirp correlation value calculation unit 231 calculates a first cross-correlation function between a reception filter passed signal acquired from the reception filter 22 and the up chirp used for the spread spectrum by the preamble generation unit 32 of the transmitter 1a (step S301). The down chirp correlation value calculation unit 232 calculates a second cross-correlation function between the reception filter passed signal acquired from the reception filter 22 and the down chirp used for the spread spectrum by the preamble generation unit 32 of the transmitter 1a (step S302).

The first STBC decoding unit 341 performs STBC decoding on the first cross-correlation function calculated by the up chirp correlation value calculation unit 231 (step S321). Specifically, the first STBC decoding unit 341 multiplies the first cross-correlation function by a complex conjugate element of the matrix expressed by expression (3) at each timing corresponding to the length of spread code $N_c \times$the number of oversamples $N_{ovs}$. The complex conjugate of the matrix expressed by expression (3) is expressed in expression (4).

[Expression 2]
$$\begin{pmatrix} s1^* & -s2 \\ s2^* & s1 \end{pmatrix} \quad (4)$$

For example, when the length of spread code used by the preamble generation unit 32 and the chirp spread units 12 and 12a is $N_c=4$, the number of oversamples is onefold, and the first cross-correlation function for the up chirp of x1, x2, x3, x4, x5, x6, x7, x8, . . . is obtained, the output of the first STBC decoding unit 341 is a matrix as expressed by expression (5).

[Expression 3]
$$\begin{pmatrix} x1s1^* + x5s2^* & x2s1^* + x6s2^* & x3s1^* + x7s2^* & \cdots \\ x1(-s2) + x5s1 & x2(-s2) + x6s1 & x3(-s2) + x7s1 & \cdots \end{pmatrix} \quad (5)$$

The first STBC decoding unit 341 outputs the first row of the sequence expressed in expression (5) to the first power value calculation unit 343, and outputs the second row of the sequence expressed in expression (5) to the second power value calculation unit 344. In the sequence expressed in expression (5), the column direction corresponds to the sample time.

Similarly, the second STBC decoding unit 342 performs STBC decoding on the second cross-correlation function calculated by the down chirp correlation value calculation unit 232 (step S322). Specifically, the second STBC decoding unit 342 multiplies the second cross-correlation function by the complex conjugate element expressed in expression (4) at each timing corresponding to the length of spread code $N_c \times$the number of oversamples $N_{ovs}$. Once obtaining a sequence similar in form to expression (5), the second STBC decoding unit 342 outputs the first row of the sequence to the third power value calculation unit 345, and outputs the second row of the sequence to the fourth power value calculation unit 346.

The power value calculation unit 352 calculates power values of the signals corresponding to the plurality of transmission antennas obtained by decoding the first cross-correlation function and power values of the signals corresponding to the plurality of transmission antennas obtained by decoding the second cross-correlation function. Specifically, the first power value calculation unit 343 and the second power value calculation unit 344 calculate the power value by squaring an absolute value of the signal acquired from the first STBC decoding unit 341 (step S323). The first power value calculation unit 343 and the second power value calculation unit 344 output the power value obtained by the calculation to the first power value combining unit 347. Similarly, the third power value calculation unit 345 and the fourth power value calculation unit 346 calculate the power value by squaring an absolute value of the signal acquired from the second STBC decoding unit 342 (step S324). The third power value calculation unit 345 and the fourth power value calculation unit 346 output the power value obtained by the calculation to the second power value combining unit 348.

The power value combining unit 353 combines the power values corresponding to the plurality of transmission antennas obtained by decoding the first cross-correlation function, and combines the power values corresponding to the plurality of transmission antennas obtained by decoding the second cross-correlation function. Specifically, when the power values acquired from the first power value calculation unit 343 and the second power value calculation unit 344 are $|b1|^2$ and $|b2|^2$, respectively, the first power value combining unit 347 combines the power values as $|b1|^2+|b2|^2$ (step S325). Similarly, when the power values acquired from the third power value calculation unit 345 and the fourth power value calculation unit 346 are $|b3|^2$ and $|b4|^2$, respectively, the second power value combining unit 348 combines the power values as $|b3|^2+|b4|^2$ (step S326).

The operation of the first averaging processing unit 235 and the second averaging processing unit 236 and subsequent operations are similar to those of the first embodiment.

Note that hardware configurations of the receiver 2a and the transmitter 1a are similar to the hardware configurations of the receiver 2 and the transmitter 1 of the first embodiment. Processing circuitry included in the receiver 2a and the transmitter 1a may include a memory and a processor executing a program stored in the memory, or may include dedicated hardware.

As described above, in the communication system 3a of the present embodiment, the STBC coding unit 31 and the preamble generation unit 32 of the transmitter 1a generate the signals for the two transmission antennas. The initial synchronization unit 23a of the receiver 2a calculates the cross-correlation function for each of the up chirp and the down chirp, and then the first STBC decoding unit 341 and the second STBC decoding unit 342 multiply the cross-correlation function by the complex conjugate of the STBC coding by the transmitter 1a, so that transmission path response values from the transmission antennas can be separated, and the power values are combined. As a result, the receiver 2a can improve the synchronization accuracy as compared to a case of using only one transmission antenna. In addition, the receiver 2a performs STBC decoding after performing correlation calculation on the spread sequence, and thus can perform the initial synchronization in which an increase in the circuit scale is prevented or reduced as the circuit scale does not depend on the number of blocks.

The receiver according to the present disclosure can estimate the spread code timing and also perform the coarse estimation of the frequency offset even in the environment where there is a large frequency offset while preventing or reducing the processing delay and preventing or reducing the increase in the circuit scale.

The configurations illustrated in the above embodiments merely illustrate an example so that another known technique can be combined, the embodiments can be combined together, or the configurations can be partially omitted and/or modified without departing from the scope.

What is claimed is:

1. A receiver comprising:
a correlation value calculator to calculate a first cross-correlation function between a received signal and an up chirp and calculate a second cross-correlation function between the received signal and a down chirp, the received signal being a signal transmitted from a transmitter and having a preamble spread with the up chirp that is a spread code whose frequency increases with time and the down chirp that is a spread code whose frequency decreases with time;
a power value calculator to calculate first power values of the first cross-correlation function and calculate second power values of the second cross-correlation function;
a correlation power memory to store the first power values and the second power values at each sample timing for one period of the spread code;
determination circuitry to determine a first estimated timing for the up chirp from the first power values for one period of the spread code, and determine a second estimated timing for the down chirp from the second power values for one period of the spread code; and
an estimator to estimate a spread code timing of the transmitter using the first estimated timing and the second estimated timing, and perform coarse estimation of a frequency offset with respect to the transmitter.

2. The receiver according to claim 1, comprising:
averaging processing circuitry to average the first power values and the second power values at each sample timing, and store-aft averaged first power values and averaged second power values in the correlation power memory.

3. The receiver according to claim 2, wherein
the determination circuitry detects a first maximum power value from the averaged first power values stored in the correlation power memory and generates a first threshold from the averaged first power values stored in the correlation power memory to determine the first estimated timing by comparing the first maximum power value with the first threshold, and detects a second maximum power value from the averaged second power values stored in the correlation power memory and generates a second threshold from the averaged second power values stored in the correlation power memory to determine the second estimated timing by comparing the second maximum power value with the second threshold.

4. The receiver according to claim 3, comprising:
a space time decoder to decode the first cross-correlation function and the second cross-correlation function calculated by the correlation value calculator using signals that are subjected to space time code in the transmitter and are transmitted from a plurality of transmission antennas; and
power combining circuitry to combine power values for the plurality of transmission antennas obtained by decoding the first cross-correlation function, and combine power values for the plurality of transmission antennas obtained by decoding the second cross-correlation function, wherein
the power value calculator calculates the power values of signals for the plurality of transmission antennas obtained by decoding the first cross-correlation function, and the power values of signals for the plurality of transmission antennas obtained by decoding the second cross-correlation function.

5. A communication system comprising:
the receiver according to claim 4; and
any one of
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time;
a frame generator to frame a data block that is spread and generated by the chirp spread circuitry and a preamble block that is spread and generated by the preamble generator; and
a space time coder to perform space time code on the data signal, wherein
the chirp spread circuitry spreads the signal subjected to space time code by the space time coder with the chirp, and
the preamble generator performs space time code on the known signal and then spreads the known signal with the up chirp and the down chirp,
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time;

a frame generator to frame a data block that is spread and generated by the chirp spread circuitry and a preamble block that is spread and generated by the preamble generator; and a space time coder to perform space time code on the data signal, wherein the chirp spread circuitry spreads the signal subjected to space time code by the space time coder with the chirp, the preamble generator performs space time code on the known signal and then spreads the known signal with the up chirp and the down chirp, and the preamble generator spreads a first half of the preamble block with one of the up chirp or the down chirp, and spreads a second half of the preamble block with another one of the up chirp or the down chirp, or a transmitter comprising:

chirp spread circuitry to spread a data signal with a chirp that is a spread code;

a preamble generator to spread a known signal with an up chirp that is a spread code whose frequency increases with time and a down chirp that is a spread code whose frequency decreases with time;

a frame generator to frame a data block that is spread and generated by the chirp spread circuitry and a preamble block that is spread and generated by the preamble generator; and a space time coder to perform space time code on the data signal, wherein the chirp spread circuitry spreads the signal subjected to space time code by the space time coder with the chirp, the preamble generator performs space time code on the known signal and then spreads the known signal with the up chirp and the down chirp, and the preamble generator divides the preamble block into a plurality of blocks, and alternately arranges a block spread with the up chirp and a block spread with the down chirp.

6. A communication system comprising:

the receiver according to claim 3; and any one of a transmitter comprising:

chirp spread circuitry to spread a data signal with a chirp that is a spread code;

a preamble generator to spread a known signal with an up chirp that is a spread code whose frequency increases with time and a down chirp that is a spread code whose frequency decreases with time; and a frame generator to frame a data block that is spread and generated by the chirp spread circuitry and a preamble block that is spread and generated by the preamble generator, a transmitter comprising:

chirp spread circuitry to spread a data signal with a chirp that is a spread code;

a preamble generator to spread a known signal with an up chirp that is a spread code whose frequency increases with time and a down chirp that is a spread code whose frequency decreases with time; and a frame generator to frame a data block that is spread and generated by the chirp spread circuitry and a preamble block that is spread and generated by the preamble generator, wherein the preamble generator spreads a first half of the preamble block with one of the up chirp or the down chirp, and spreads a second half of the preamble block with another one of the up chirp or the down chirp, or a transmitter comprising:

chirp spread circuitry to spread a data signal with a chirp that is a spread code;

a preamble generator to spread a known signal with an up chirp that is a spread code whose frequency increases with time and a down chirp that is a spread code whose frequency decreases with time; and a frame generator to frame a data block that is spread and generated by the chirp spread circuitry and a preamble block that is spread and generated by the preamble generator, wherein the preamble generator divides the preamble block into a plurality of blocks, and alternately arranges a block spread with the up chirp and a block spread with the down chirp.

7. The receiver according to claim 2, comprising:

a space time decoder to decode the first cross-correlation function and the second cross-correlation function calculated by the correlation value calculator using signals that are subjected to space time code in the transmitter and are transmitted from a plurality of transmission antennas; and power combining circuitry to combine power values for the plurality of transmission antennas obtained by decoding the first cross-correlation function, and combine power values for the plurality of transmission antennas obtained by decoding the second cross-correlation function, wherein the power value calculator calculates the power values of signals for the plurality of transmission antennas obtained by decoding the first cross-correlation function, and the power values of signals for the plurality of transmission antennas obtained by decoding the second cross-correlation function.

8. A communication system comprising:

the receiver according to claim 5; and any one of a transmitter comprising:

chirp spread circuitry to spread a data signal with a chirp that is a spread code;

a preamble generator to spread a known signal with an up chirp that is a spread code whose frequency increases with time and a down chirp that is a spread code whose frequency decreases with time;

a frame generator to frame a data block that is spread and generated by the chirp spread circuitry and a preamble block that is spread and generated by the preamble generator; and a space time coder to perform space time code on the data signal, wherein the chirp spread circuitry spreads the signal subjected to space time code by the space time coder with the chirp, and the preamble generator performs space time code on the known signal and then spreads the known signal with the up chirp and the down chirp, a transmitter comprising:

chirp spread circuitry to spread a data signal with a chirp that is a spread code;

a preamble generator to spread a known signal with an up chirp that is a spread code whose frequency increases with time and a down chirp that is a spread code whose frequency decreases with time;

a frame generator to frame a data block that is spread and generated by the chirp spread circuitry and a preamble block that is spread and generated by the preamble generator; and
a space time coder to perform space time code on the data signal, wherein
the chirp spread circuitry spreads the signal subjected to space time code by the space time coder with the chirp,
the preamble generator performs space time code on the known signal and then spreads the known signal with the up chirp and the down chirp, and
the preamble generator spreads a first half of the preamble block with one of the up chirp or the down chirp, and spreads a second half of the preamble block with another one of the up chirp or the down chirp, or
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time;
a frame generator to frame a data block that is spread and generated by the chirp spread circuitry and a preamble block that is spread and generated by the preamble generator; and
a space time coder to perform space time code on the data signal, wherein
the chirp spread circuitry spreads the signal subjected to space time code by the space time coder with the chirp,
the preamble generator performs space time code on the known signal and then spreads the known signal with the up chirp and the down chirp, and
the preamble generator divides the preamble block into a plurality of blocks, and alternately arranges a block spread with the up chirp and a block spread with the down chirp.

9. A communication system comprising:
the receiver according to claim 2; and
any one of
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time; and
a frame generator to frame a data block that is spread and generated by the chirp spread circuitry and a preamble block that is spread and generated by the preamble generator,
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time; and
a frame generator to frame a data block that is spread and generated by the chirp spread circuitry and a preamble block that is spread and generated by the preamble generator,
wherein the preamble generator spreads a first half of the preamble block with one of the up chirp or the down chirp, and spreads a second half of the preamble block with another one of the up chirp or the down chirp, or
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time; and
a frame generator to frame a data block that is spread and generated by the chirp spread circuitry and a preamble block that is spread and generated by the preamble generator, wherein
the preamble generator divides the preamble block into a plurality of blocks, and alternately arranges a block spread with the up chirp and a block spread with the down chirp.

10. The receiver according to claim 1, comprising:
a space time decoder to decode the first cross-correlation function and the second cross-correlation function calculated by the correlation value calculator using signals that are subjected to space time code in the transmitter and are transmitted from a plurality of transmission antennas; and
power combining circuitry to combine power values for the plurality of transmission antennas obtained by decoding the first cross-correlation function, and combine power values for the plurality of transmission antennas obtained by decoding the second cross-correlation function, wherein
the power value calculator calculates the power values of signals for the plurality of transmission antennas obtained by decoding the first cross-correlation function, and the power values of signals for the plurality of transmission antennas obtained by decoding the second cross-correlation function.

11. A communication system comprising:
the receiver according to claim 10; and
any one of
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time;
a frame generator to frame a data block that is spread and generated by the chirp spread circuitry and a preamble block that is spread and generated by the preamble generator; and
a space time coder to perform space time code on the data signal, wherein
the chirp spread circuitry spreads the signal subjected to space time code by the space time coder with the chirp, and
the preamble generator performs space time code on the known signal and then spreads the known signal with the up chirp and the down chirp,
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time;

a frame generator to frame a data block that is spread and generated by the chirp spread circuitry and a preamble block that is spread and generated by the preamble generator; and a space time coder to perform space time code on the data signal, wherein the chirp spread circuitry spreads the signal subjected to space time code by the space time coder with the chirp, the preamble generator performs space time code on the known signal and then spreads the known signal with the up chirp and the down chirp, and the preamble generator spreads a first half of the preamble block with one of the up chirp or the down chirp, and spreads a second half of the preamble block with another one of the up chirp or the down chirp, or a transmitter comprising:

chirp spread circuitry to spread a data signal with a chirp that is a spread code;

a preamble generator to spread a known signal with an up chirp that is a spread code whose frequency increases with time and a down chirp that is a spread code whose frequency decreases with time;

a frame generator to frame a data block that is spread and generated by the chirp spread circuitry and a preamble block that is spread and generated by the preamble generator; and a space time coder to perform space time code on the data signal, wherein the chirp spread circuitry spreads the signal subjected to space time code by the space time coder with the chirp, the preamble generator performs space time code on the known signal and then spreads the known signal with the up chirp and the down chirp, and the preamble generator divides the preamble block into a plurality of blocks, and alternately arranges a block spread with the up chirp and a block spread with the down chirp.

12. A communication system comprising:
the receiver according to claim 1; and
any one of
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time; and
a frame generator to frame a data block that is spread and generated by the chirp spread circuitry and a preamble block that is spread and generated by the preamble generator,
a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time; and
a frame generator to frame a data block that is spread and generated by the chirp spread circuitry and a preamble block that is spread and generated by the preamble generator, wherein
the preamble generator spreads a first half of the preamble block with one of the up chirp or the down chirp, and spreads a second half of the preamble block with another one of the up chirp or the down chirp, or a transmitter comprising:
chirp spread circuitry to spread a data signal with a chirp that is a spread code;
a preamble generator to spread a known signal with an up chirp that is a spread code whose frequency increases with time and a down chirp that is a spread code whose frequency decreases with time; and
a frame generator to frame a data block that is spread and generated by the chirp spread circuitry and a preamble block that is spread and generated by the preamble generator, wherein
the preamble generator divides the preamble block into a plurality of blocks, and alternately arranges a block spread with the up chirp and a block spread with the down chirp.

13. A control circuit that controls a receiver and causes the receiver to execute:
calculation of a first cross-correlation function between a received signal and an up chirp and calculation of a second cross-correlation function between the received signal and a down chirp, the received signal being a signal transmitted from a transmitter and having a preamble spread with the up chirp that is a spread code whose frequency increases with time and the down chirp that is a spread code whose frequency decreases with time;

calculation of first power values of the first cross-correlation function and calculation of second power values of the second cross-correlation function;

storage of the first power values and the second power values at each sample timing for one period of the spread code;

determination of a first estimated timing for the up chirp from the first power values for one period of the spread code, and determination of a second estimated timing for the down chirp from the second power values for one period of the spread code; and estimation of a spread code timing of the transmitter using the first estimated timing and the second estimated timing, and coarse estimation of a frequency offset with respect to the transmitter.

14. A non-transitory storage medium storing a program for controlling a control circuit that controls a receiver, wherein the program causes the receiver to execute:
calculation of a first cross-correlation function between a received signal and an up chirp and calculation of a second cross-correlation function between the received signal and a down chirp, the received signal being a signal transmitted from a transmitter and having a preamble spread with the up chirp that is a spread code whose frequency increases with time and the down chirp that is a spread code whose frequency decreases with time;

calculation of first power values of the first cross-correlation function and calculation of second power values of the second cross-correlation function;

storage of the first power values and the second power values at each sample timing for one period of the spread code;

determination of a first estimated timing for the up chirp from the first power values for one period of the spread code, and determination of a second estimated timing for the down chirp from the second power values for one period of the spread code; and estimation of a spread code timing of the transmitter using the first estimated timing and the second estimated timing, and coarse estimation of a frequency offset with respect to the transmitter.

* * * * *